May 1, 1928.
S. G. THOMSON
1,668,092
CONVERTIBLE WHEEL STRUCTURE
Filed Feb. 2, 1926
6 Sheets-Sheet 5
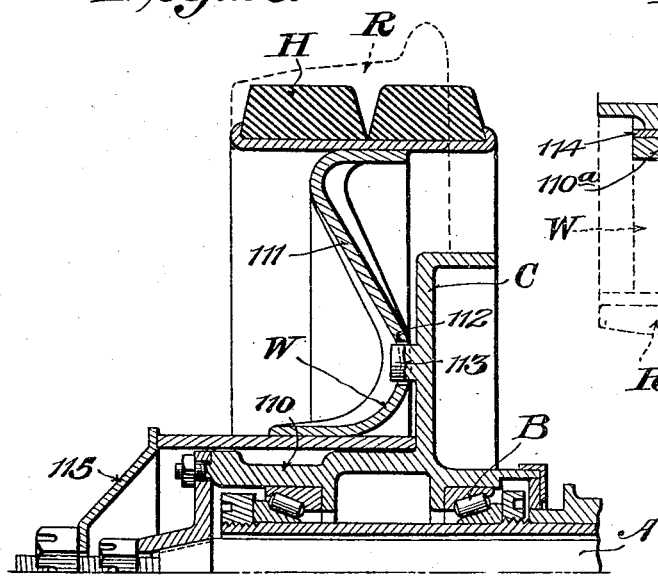
Fig.23.
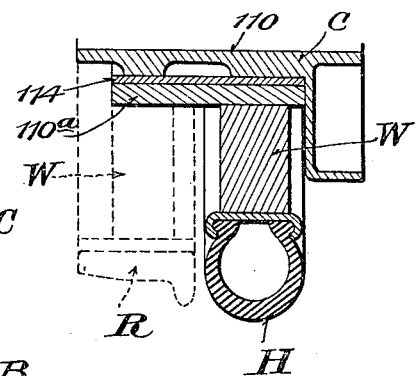
Fig.24ᵃ
Fig.24.
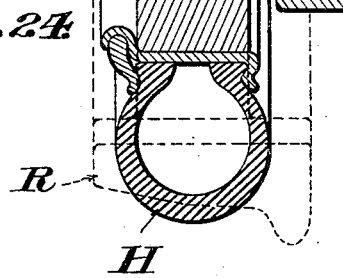
Inventor
Samuel G. Thomson,

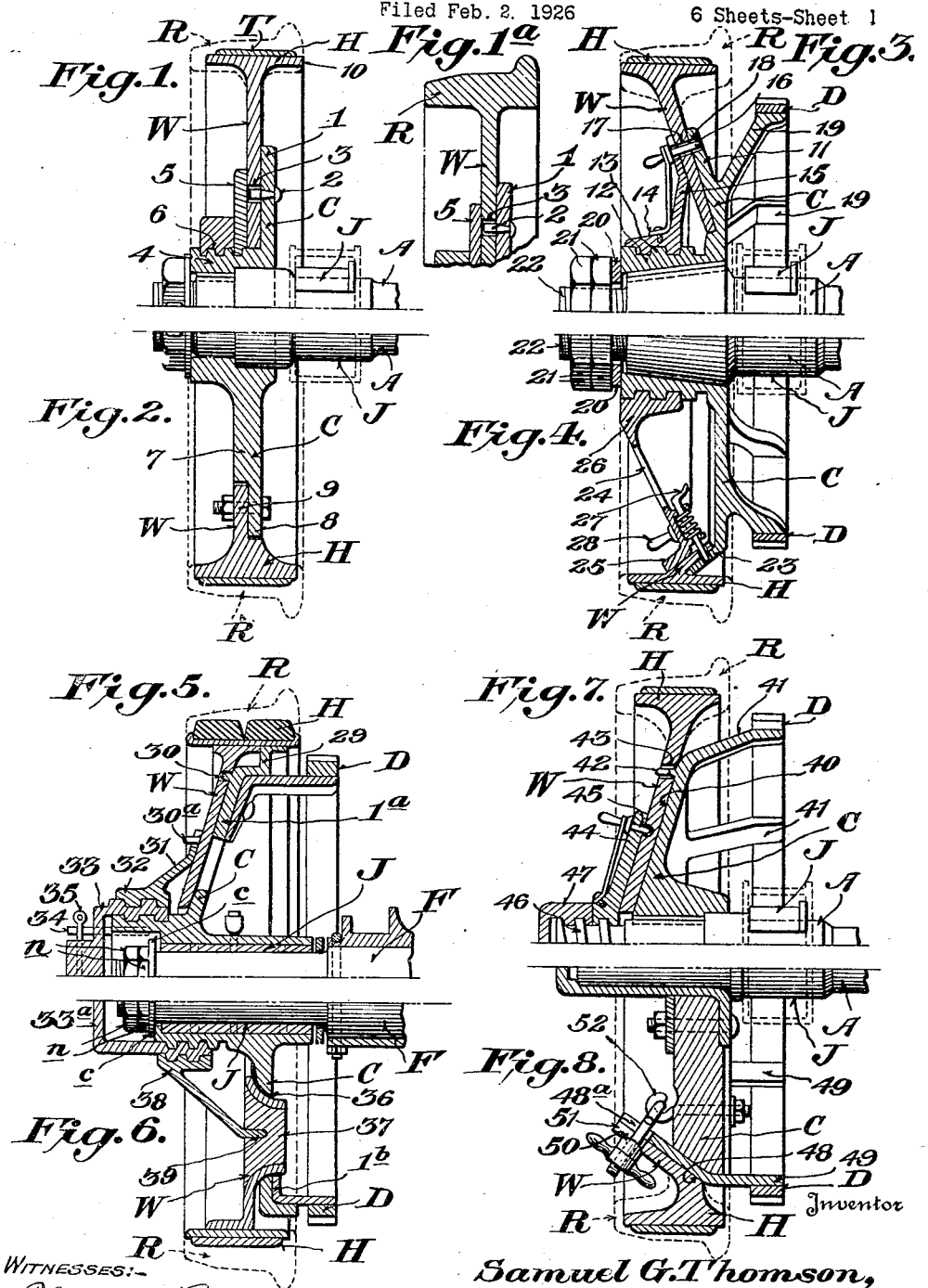

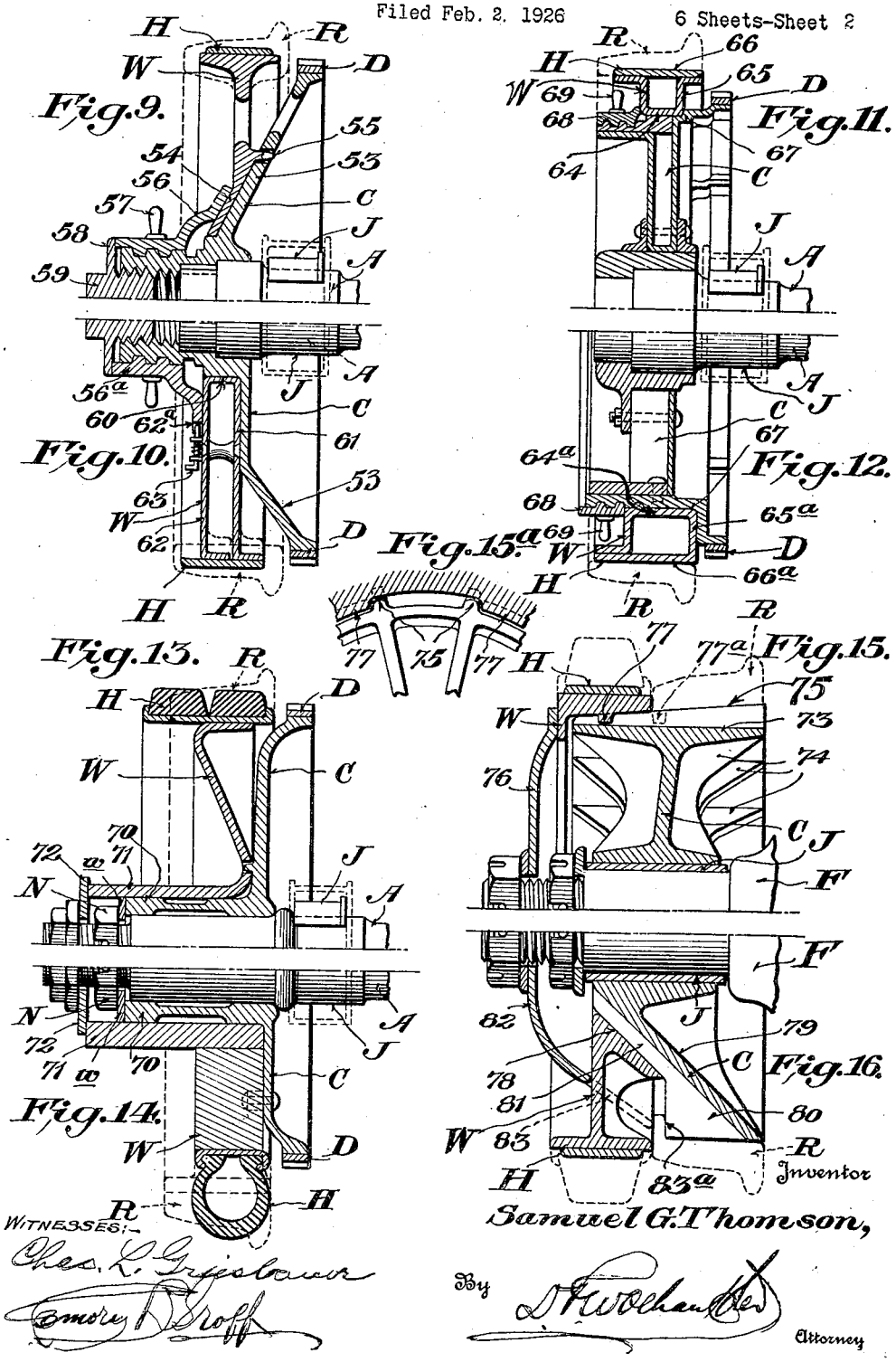

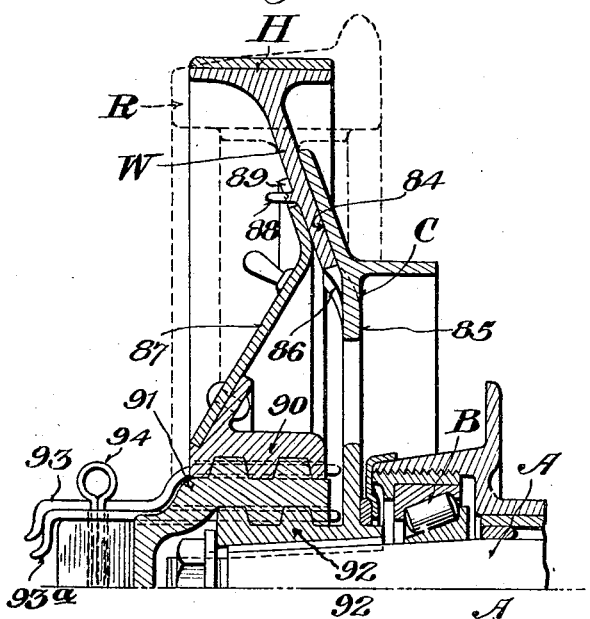
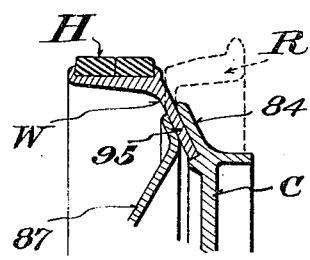
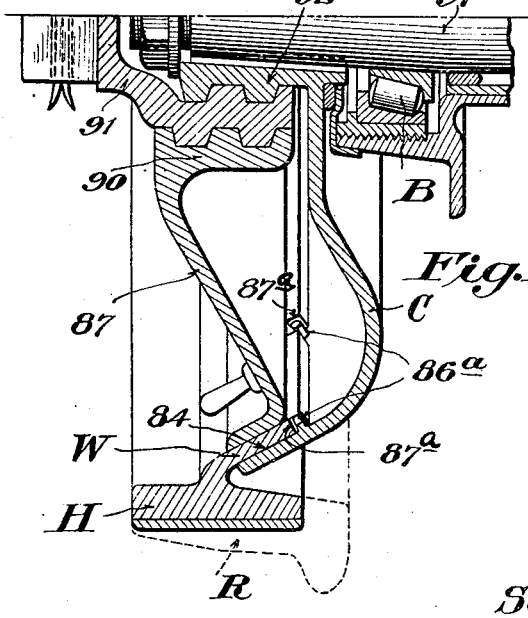
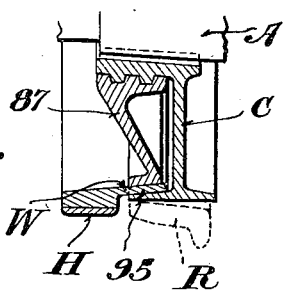

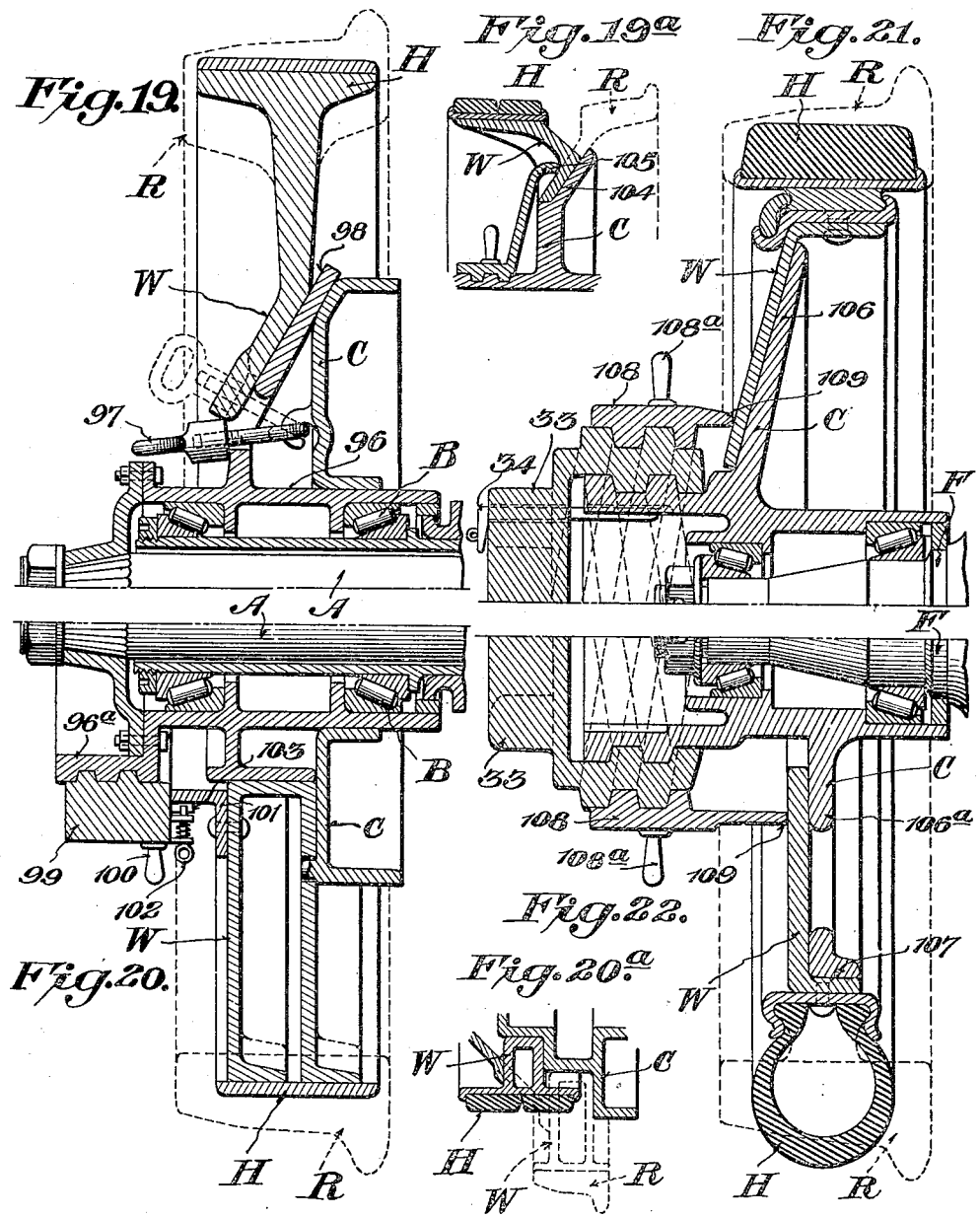

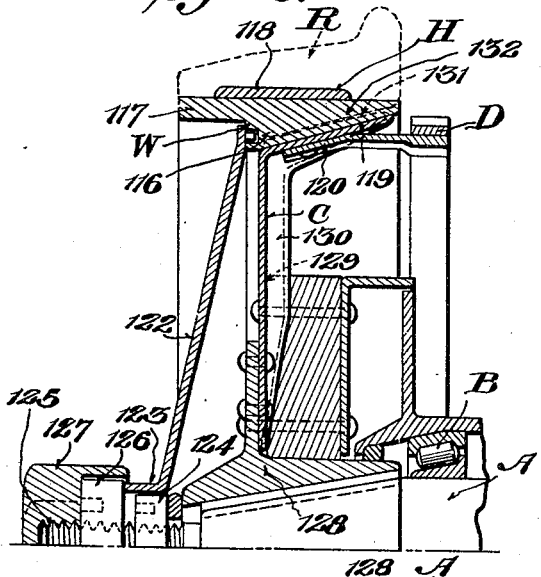
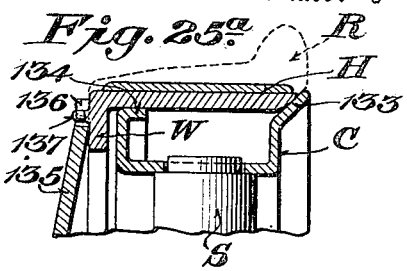
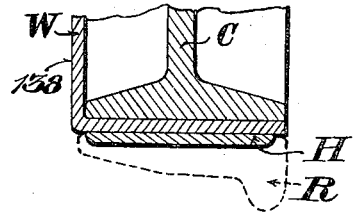
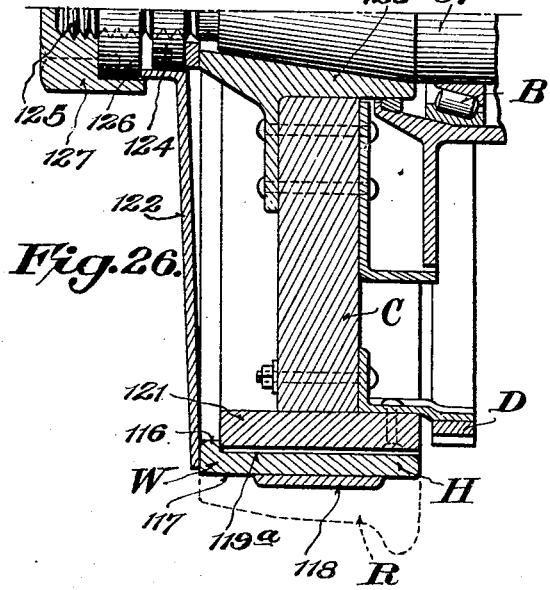
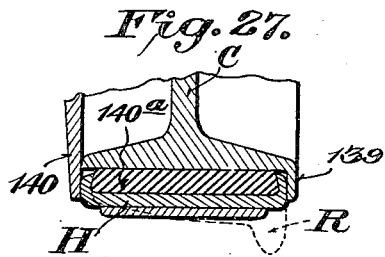
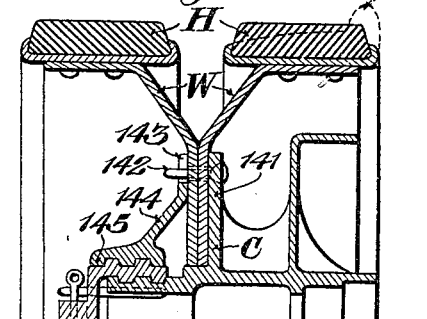

Patented May 1, 1928.

1,668,092

UNITED STATES PATENT OFFICE.

SAMUEL G. THOMSON, OF NEW YORK, N. Y.

CONVERTIBLE WHEEL STRUCTURE.

Application filed February 2, 1926. Serial No. 85,512.

This invention relates to a wheel structure having interchangeable treads adapted to convert the wheel structure for use on either railway tracks or on highways.

It is well recognized that a vehicle can be operated over a steel track with much greater economy than over the best built and smoothest highway, and many traffic routes exist throughout the country which could profitably include a railway track for a considerable portion thereof, provided a wheel structure be available which affords a speedy change from rail to highway service and vice-versa. In that connection, the invention has in view the construction of such a wheel, whereby a vehicle equipped therewith may carry its load undisturbed and interchangeably over both railway tracks and highways, thus adapting the vehicle to be used as a delivery and pick-up service, as well as for the longer hauls over the railway.

Having in view such conversion of a wheel, one of the primary objects of the invention is to provide a novel manner of mounting removable and interchangeable tread members on a wheel center in connection with which they are adapted to be used, preferably through the medium of clamping members and auxiliary devices such as will hold the tread members tightly in their operating positions, and at the same time by a few turns and quick movements permit such tread members to be interchanged with great facility, whereby the service of the vehicle may be changed in a small fraction of the time that would be required to unload and reload goods, or even to handle a demountable body. In this connection, the invention recognizes the necessity of the parts being held against looseness and rattle and yet permit them to be quickly and easily releasable. Also that, in the conversion of a wheel having this dual function or railway track service and highway service, it is essential that a wide variety of designs and combinations of clamping members are required to meet the different needs in connection with the different kinds of wheels necessary for the various kinds of service.

In carrying out these objects, the invention is susceptible of a wide range of modifications without departing from the spirit or sacrificing any of the advantages of the claimed invention; but for illustrative purposes there are shown in the drawings certain preferred and practical forms, in which:

Figure 1 represents a transverse sectional view of a portion of a vehicle wheel embodying one form of this invention with the highway tread member shown in full lines and the rim portion of the railway tread member shown in dotted lines, to indicate that one of these members is interchangeable with the other.

Fig. 1ª is a view similar to Fig. 1 showing the highway tread member replaced by substituting therefor the railway tread member; and in the succeeding figures of the drawings, to avoid multiplying the views, the rim portion of the interchangeable railway tread member is indicated by dotted lines, while its web or clamping flange portion is coincident with the same portion of the highway tread member.

Fig. 2 is a similar view showing a slightly different form of the invention which is also a simplification thereof.

Figs. 3 and 4 are similar views showing novel forms of latch connecting means for uniting the wheel center, its treads and the holding or clamping means therefor.

Fig. 5 is a sectional view of a portion of a wheel showing a modified form of tread and center connection, in which the webs of the wheel center and of the treads contact for their full length, and are suitably interlocked.

Fig. 6 is a similar view showing a different form of the connection between the wheel center and its detachable treads.

Figs. 7 and 8 represent sectional half views showing other forms of the invention in which a spring latch and a swinging clamp are employed to assist in connecting the tread members with the wheel center.

Figs. 9 and 10 illustrate sectional half views showing still other forms of the invention with threaded clamping means for securing the detachable wheel treads to the wheel center.

Figs. 11 and 12 represent sectional half views of types of wheel centers having cylindrical contact faces for the tread members, and a clamping ring or nut of very large diameter.

Figs. 13 and 14 represent sectional half views of the same types as those illustrated in Figs. 11 and 12, except that the cylindrical contacting faces for the tread members are of relatively smaller diameter.

Fig. 15 is a sectional half view illustrating a design in which the wheel-center is mounted on the usual journal of a fixed axle, and has a wide rim stiffened by ribs joining it to the wheel web and hub.

Fig. 15ª is a detail side elevation of Fig. 15.

Fig. 16 is a similar view showing a design in which the wheel web is made slanting, and a deep and shallow clamping cone used to hold the tread members in position.

Figs. 17 and 18 are sectional half views illustrating designs similar to those shown in Figs. 3 and 4.

Figs. 17ª and 18ª are sectional views of modifications of the forms shown in Figs. 17 and 18, in which the position of the treads are separated laterally.

Figs. 19 and 20 are sectional half views illustrating designs similar to the forms shown in Figs. 9 and 10 relative to the bearing of the tread member of the wheel centers; but these forms differ in that the structures shown here comprise internally driven roller bearing hubs of usual automotive design.

Fig. 19ª is a transverse section showing a modification of the form illustrated in Fig. 19, and is similar to the arrangement shown in Fig. 17ª, in that, two treads are employed and separated laterally to provide a gauge or track width of the highway tread which is substantially greater than that of the width of the railway tread.

Fig. 20ª is a transverse detail section showing a modification of the form illustrated in Fig. 20. In this design, the two treads are separated laterally, and the diameters of the two treads differ considerably.

Figs. 21 and 22 also represent sectional half views illustrating other designs of wheels such as are employed in automotive construction. Double-throw clamping rings are shown for connecting the tread member with the wheel center.

Figs. 23 and 24 are transverse sectional half views of wheels similar to those shown in Figs. 13 and 14, except that in these figures the usual automotive construction is included. Fig. 23 shows the tread members as having reinforced S-shaped plate disks or webs.

Fig. 24ª is a detail transverse sectional view illustrating a modification of the form shown in Fig. 24, in which the highway tread has the inside position relative to the railway tread. This effects a narrower gauge or track for the former than for the latter.

Figs. 25 and 26 are sectional half views which illustrate types of tread members having little or no disk or clamping web.

Fig. 25ª is a detail sectional view showing a modification of the form illustrated in Fig. 25, applied to a wheel with wooden spokes.

Fig. 26ª is a similar view showing a modification of the form shown in Fig. 26, in which the tread members and clamping plates or cones are made integral.

Fig. 27 is a detail sectional view and illustrates a wheel center having a flange standing up around one edge of its rim to engage the inner edges of the tread members, which members may have a cushion or resilient portion interposed between them and the wheel rim.

Fig. 28 is a transverse sectional view of a portion of a wheel and illustrates a ribbed cast wheel center of the usual type for heavy auto trucks adapted to carry two separate highway tread members, and an interchangeable railway tread member.

Like references designate corresponding parts throughout the several figures of the drawings.

This invention contemplates in the conversion of such a wheel for use on highways and railway tracks respectively, the provision of a common wheel center and interchangeable tread members, one of which is adapted for railway service and the other for highways, these tread members to be similarly constructed and attached so that they may be interchanged with great facility, thereby rendering this quick change feature into one of the regular service facilities of the vehicle equipped with the interchangeable wheel structure.

In carrying this invention into effect it is proposed to interchangeably apply to a common wheel center designated generally as C, the tread members H and R, each of which includes a web or spoke portion W and a tread portion T. Other members common to the various forms and having the same designation are: the revolving axle or drive shaft A, fixed axle or wheel-pin F, ball or roller bearing B, journal or journal-bearing J, and driving sprocket or rack D.

One of the distinctive features of this invention resides in so mounting the interchangeable tread members on the wheel center that they may be speedily applied and removed, and which when applied, are securely held and yet quickly and easily released. Therefore, a feature fundamental to all forms of the invention and shown in the various examples illustrated in the several figures of the drawings, is that of firmly and reliably mounting the detachable and interchangeable tread members on the wheel center, and securely holding the parts against looseness and rattle, the holding means utilized being designed and arranged to effectively maintain that relation between the wheel center and its tread members.

The various forms may be classified according to the nature of the contact of the tread members with the wheel center. In this respect, it will be noted that the vertical webs W of the interchangeable tread members contact with a vertical face of the wheel center C in Figs. 1, 2, 6, 10, 14, 22 and 28, while in Figs. 3, 4, 17 and 18 webs W contact with a concave conical face of the wheel center; in Figs. 5, 7, 8, 9, 16, 19 and 21 webs W contact with a covex conical face of the wheel center, and in Figs. 11, 12, 15, 25 and 26 such contact is made with an outer face of the rim portion of the wheel center, which face is either cylindrical or very slightly conical and not far short of the working tread diameter of the wheel, while they contact with a face having a much smaller diameter and which is substantially that of the outer face of the wheel hub in Figs. 13, 14, 23 and 24. In Fig. 20 the wheel center provides bearing faces for the interchangeable tread members in the form of cylindrical and vertical faces of a step-cone.

In order to bring out certain structural differences, the forms shown in the various figures of the drawings may be separated into two general classes comprising railway and wagon practice illustrated in Figs. 1 to 16 inclusive, and automotive practice, Figs. 17 to 26 inclusive. In the first class, all figures except 5, 6, 15, 16, show the wheel center clamped on or keyed to a revolving axle of the railway type, while Figs. 5, 6, 15 and 16 show a fixed axle with a journal bearing of the kind usually applied to heavy wagons or automobile trucks. Figs. 1 to 4 and 7 to 14 show a journal bearing and box applied inside of the wheel to a revolving axle in accordance with the usual practice for engine trucks, it being of course understood that roller or other types of antifriction bearings may be substituted in these arrangements to allow the axle to turn with the wheel.

In Figs. 17 to 20 and 23 to 26 are illustrated designs in which the wheel center is attached to a driving shaft or revolving axle, the bearing being, either enclosed within the wheel hub and carried by a driving shaft housing, or located at the edge of the wheel hub and carried directly by the revolving axle or shaft.

In the form shown in Figs. 21 and 22, the wheel center is mounted on a fixed or swinging wheel pin by the use of roller bearings enclosed within the hub.

It is to be understood that any suitable driving means for these wheels may be employed. A rack D for chain drive is shown attached to the wheel center in some of the designs, while in other designs, a driving shaft or axle A is either keyed to the internal bore of the wheel center or is extended through the bore and attached to the outer edge of the wheel hub.

In the embodiment illustrated in Fig. 1, the wheel center C has a vertical clamping flange or web 1 carrying one or more pins 2 designed to interlock with corresponding holes 3 formed in the webs W of the tread members, which webs are here shown vertical and contacting with the outer face of the vertical clamping flange 1 of the wheel center. This interlocking arrangement prevents relative movement between the wheel center and the tread members. In this form of the invention, the outer face of the hub 4 of the wheel center is threaded and engaged by an internally threaded clamping disk or plate 5 and also by a jam nut 6 which coacts with said plate in locking the parts against backing off and becoming loose. In Fig. 2, the wheel center C has a vertical web 7 provided around its perimeter with an offset flange-like member 8 which matches similar offsets 9 in the webs W of the tread members H and R. The tread members in this form of the invention are shown as having short bolting flanges which are bolted to the offset flange member 8 of the wheel center.

Another arrangement for connecting the tread members H and R with the wheel center C is shown in Fig. 3, in the form of a concave conical outer face or web 11 carried by the wheel hub 12, which hub has been externally threaded as shown at 13 to have threaded engagement with an internally threaded collar 14 carrying a clamping disk or spider 15. The clamping disk 15 is provided with one or more spring-actuated pins or latches 16 designed to engage with a series of registering apertures carried respectively by the webs W of the tread members and the wheel center flange 11 and which are indicated by the numerals 17 and 18 respectively. These latch pins lock the wheel center, the tread member web and the clamping plate against relative rotation.

The wheel center C has brackets 19 which project inwardly at intervals and support a rack D for a chain drive. It will thus be seen that the driving action of the chain around rack D will act positively through the interlocked pins 16 in delivering the power to the tread member, which member may be either in the form of a highway tread shown in full lines at H or a railway tread member shown in dotted lines at R.

The wheel center C is keyed to the revolving axle A and held by the usual retaining collar 20 and jam nuts 21 which are threaded around a projecting portion 22 of the axle A.

In the adaptation of the invention shown in Fig. 4, the tread members H and R have short inwardly projecting webs W positioned at an incline to contact with the under face of an inclined flanged rim 23 carried by the periphery of the wheel center C. A clamping disk 24 has an out-turned clamping flange 25 which engages the tread web W and holds it tightly against the under face of the rim 23 of the wheel center. This disk 24 has a hub 26 threaded around the hub of the wheel center, said disk carrying spring latches 27 which operate parallel with the body portion of the disk on the inner face thereof and are designed to engage apertures in the web W and flange 23, which apertures register to receive these latches. These latches operate to prevent relative rotation between the disk, the wheel tread and the wheel center. The disk as shown is equipped with operating handles 28 to facilitate its application and removal.

In Fig. 5 the wheel center C has its web 1ª provided with a convex conical outer face and an offset portion 29 at its perimeter which is designed to assist in supporting the tread members H and R. In this form of the invention, the webs W of the tread members are arranged obliquely and contact with the full width of the conical face of the wheel-center, and interlock with one or more pins 30 which project from this center. A clamping cone 31 has threaded engagement at its hub 32 with a combined clamping-nut and hub-cap 33, and bears against the web W of the tread member, said cone having apertures for engagement with the pins 30ª which project from the tread member and which prevent relative rotation of these parts.

The clamping nut 33 has left-hand threaded engagement with the internally threaded hub of the clamping cone and right-hand threaded engagement with the wheel hub. This provides a double throw for the clamping parts as they are rotated by a wrench applied to the clamping nut, in the operation of applying and removing the tread members.

The clamping nut 33 has threaded engagement with the hub of the wheel center C, and is held against rotation by a key 34 which passes through the outer face of the cap and engages slots arranged around the enlarged end-bore of the wheel hub. This key is inserted after the clamping members are drawn tight, and is held in place by a cotter pin 35 passing through the squared portion of the cap. In the form shown, the hub of the wheel center C is internally bored to fit a bush-lining, which in turn contacts with the journal of a fixed axle F. The wheel is held to its position by the usual retaining collar c and jam nuts n.

The embodiment illustrated in Fig. 6 is similar to that shown in Fig. 5 as regards the journal bearing and double throw clamping members; but in this form, the web 1ᵇ of the wheel center C is vertical, and has large openings 36 spaced around the wheel, which openings are designed to receive bearing projections 37 stamped out of the webs W of the tread members H and R. A clamping cone 38 is threaded around the hub cap 33ª, and has projections 39 to extend inside the hollow projections 37 of the web W and which operates to lock the parts against relative rotation. It is to be understood that the apertures 36 in the wheel center and the corresponding bearing projections 37 in the tread webs may be of any desired shape to afford good cooperating bearings and also used as means for lightening these members.

Other variations of the invention are shown in Figs. 7 and 8, wherein the wheel centers C are in the form of plates provided with convex conical outer bearing faces 40 and 48, and with brackets 41 and 49 to carry the sprocket rack or gear D. In Fig. 7 the webs W of the tread members H and R comprise disks extending from the rim portion of the tread members to the wheel hub, the greater portion of which bears against the wheel center C. Pins 42 project from the outer face of the wheel center through openings 43 formed in the webs W, and hold these members against relative rotation. A clamping cone 44 bears against the face of the web W, and carries a spring latch 45 to engage a series of apertures formed in the web W. The hub of this cone has threaded engagement with a projection 46 carried by the axle A to which the hub of the wheel center C is keyed. A hub cap 47 operates as a jam lock against the threaded hub of the clamping cone.

A wooden-spoke wheel-center C is shown in Fig. 8, provided with a conical bearing plate 48, which is equipped with projections 49 to support the rack or sprocket wheel D. The webs W of the tread members H and R are inclined to correspond with the face 48, and are secured thereto by swinging clamps 50 carried by the wheel center C and which are designed to register with slots 48ª and 51 arranged respectively around the edges of the plate having inclined face 48 and the web W. The clamps 50 are shown mounted on hook bolts 52 which are carried by the spokes of the wheel center C.

In the forms illustrated in Figs. 9 and 10, the usual types of conical disk wheel are shown at C extending to the outer edge or perimeter of the disk 53, to which is secured the driving sprocket D. The webs W of the tread members H and R bear on the inner half of these disks adjacent to the wheel hub. In Fig. 9 this bearing 54 is conical, and pins 55 project from the inner face of web W and interlock with openings in the disk 53. These interlocking parts hold the web and center against relative rotation. A clamping cone 56 has threaded engagement with the wheel hub, and bears against the outer face of the member 54 of the web W and securely clamps it to the wheel center.

This cone is preferably provided with operating handles 57 to facilitate its manipulation. Any suitable means may be provided for holding the threaded hub of the cone against backing off, the means here shown being in the form of a flange 58 carried by a hub cap 59 which is threaded into the end of the wheel hub.

Fig. 10 is similar to Fig. 9, except that the webs W of the tread members have cylindrical bearings on the hub of the wheel center C as shown at 60 and vertical bearings against its web as shown at 61 respectively. The clamping cone 56$^a$ is similar to that shown in Fig. 9, except that the periphery thereof is provided with a plurality of teeth 62$^a$ designed to receive a spring latch 63 carried by the web W.

In the modifications shown in Figs. 11 and 12, wheel centers C are illustrated as having cylindrical contact faces for the tread members H and R, which faces are herein designated 64 and 64$^a$ respectively in the two figures. These contact faces are of large diameter and comprise the outer face of the rim of the wheel center C, the tread members H and R in these forms being made in the form of shallow annular rings 65 and 65$^a$ which are preferably channel-shaped in cross-section and have mounted over said channels tire-like rings or plate 66 and 66$^a$ respectively, the plate 66$^a$ being shown in Fig. 12 as made integral with the channel while in Fig. 11 it constitutes a separate member. These shallow tread members are slipped over the rim of the wheel center and held against an offset 67 formed at the inner edge of the cylindrical bearing face of the wheel center, and are secured by a clamping ring 68 threaded around the outer portion of the wheel-center rim. These clamping rings carry operating handles 69 to facilitate their application and removal.

The forms shown in Figs. 13 and 14 also have cylindrical contacting faces between the tread members and the wheel center C, such faces being of relatively small diameter compared with those shown in Figs. 11 and 12, and comprising the outer face of the wheel hub 70 and the inner face of a hub member or sleeve 71 carried by the web W. In this adaptation of the invention, the web or spoke portions of the wheel structure constitute a part of the interchangeable tread members H and R, while in the forms shown in Figs. 11 and 12, the web and spoke portions are a part of the permanent wheel center C. As shown in Figs. 13 and 14, these spoke portions of the tread members occupy the greater part of the diameter of the wheel, and terminate adjacent to the center of the wheel in tubular hub portions 71 which are designed to slip over the hub 70 of the wheel center C and be drawn tightly against the vertical web of said center by jam nuts threaded around an extension of the axle and by washer plates 72 engaging the outer ends of these tubular portions. The hub 70 of the wheel center C is held to a driving fit on the axle by the usual castle-nut N and washer w.

In the form shown in Fig. 15, the wheel center C is mounted on the usual journal J of a fixed axle F or swinging wheel-pin. This center has a wide rim 73 stiffened by ribs 74 which connect it to the wheel web and hub. The wide outer face of rim 73 has tapered ribs 75 running across its face at right angles to its direction of rotation. These ribs 75 afford bearings for the under faces of the tread members H and R, which in this form of the invention are shown arranged side by side, being slipped over the tapered ribs to occupy tight operating positions. A clamping disk 76 engages the outer face of the highway tread member H and holds the two members H and R against the tapered edges of the ribs 75. Between said ribs, short projections 77 and 77$^a$ depend respectively from the under faces of the members H and R and are designed to engage one or both sides of the adjacent bearing ribs 75 in order to prevent relative rotation of the tread members and the wheel center. It is to be noted that in this form of the invention as well as that shown in Figs. 16, 17$^a$, 18$^a$, 19$^a$, that the tread members H and R in their working positions are mounted side by side, thus affording a width of track for highway service substantially wider than for railway track service, that is, the distance between the highway tread is substantially wider than the standard 56½" railway track gauge. This feature is advantageous in stabilizing the highway load against rocking and upsetting, and in obtaining a comparatively large tire bearing area on the highway. Two tread diameters are shown for the highway tread member H, the smaller of which is shown in full lines and the larger in dotted lines, the full line tread member being of less diameter than the railway tread member R, and the dotted line member is of greater diameter than said railway tread member.

With the parts in the position shown in Fig. 15, the wheel may be used for railway track service without removing the full line tread member H; but before the wheel goes into highway service, the railway member R must be removed. On the other hand, when the highway tread member with the dotted line tread is used the railway tread member R may remain in position while the vehicle is in highway service.

This same relation between the tread members is shown in Fig. 16. This modification shows the wheel center C with a slanting web 79 having outside bearing ribs 80 and 81 to carry the tread members R and H respectively. These ribs afford an intermittent cylindrical rib-bearing for the railway tread member R, and an intermittent conical rib-bearing for the highway member H. Two clamping cones 82 and 83 are employed to hold the tread members in position, the clamp 83 being shown deep and 82 shallow. A rib 83ᵃ around the under face of R stops the flanged tire R at the proper track gauge.

The forms shown in Figs. 17 and 18 are similar to those illustrated in Figs. 3 and 4, except that they include a double throw clamping mechanism similar to that shown in Fig. 5. The tread members have inclined webs W which bear against the concave conical face 84 of the wheel center C. In Fig. 17 the web 85 of the wheel center has arranged at intervals around the inner edge thereof displaced portions 86 which operate as a seat and centering device for the inner edge of the webs W of the tread members. In Fig. 18 this centering device is formed by pins 86ᵃ projecting from the underside of the web of the wheel center C. These pins enter notches 87ᵃ in the perimeter of the tread webs W to prevent relative rotation of the wheel center and tread members.

In Fig. 17, the separate parts are locked against relative rotation by means of keys 93 and 93ᵃ extending through the double-throw threads of the clamping mechanism and by pins 88 projecting from the web W of the tread member and entering slots 89 in the cone member 87. This cone member has a hub 90 which may have left-hand threaded engagement with a clamping nut and hub cap 91, which, in turn, may be right-hand threaded onto the hub 92 of the wheel center. After these parts have been tightened up they may be secured in this position by any suitable means, keys 93 and 93ᵃ being here shown for this purpose. These keys are inserted in holes and slots arranged at intervals around the external and internal threads of the clamping nut, thus locking together the hub 90 of the cone clamping member and hub 92 of wheel center C. The keys are shown held by a cotter pin 94 which passes through the keys and the squared extension of the clamping nut.

The modifications illustrated in Figs. 17ᵃ and 18ᵃ show forms similar to those shown in Figs. 17 and 18, the difference being that the treads H and R are arranged side by side and separated laterally by positioning them laterally in opposite directions from their clamping flanges 95. These clamping flanges for each tread engage the same bearing face on the wheel center C, while in Figs. 15 and 16, the tread members H and R engage different bearing faces on wheel center C.

The forms of the invention shown in Figs. 19 and 20 are similar to those shown in Figs. 9 and 10 as regards the bearing of the tread members on the wheel center C, the difference being that, in Figs. 19 and 20, the structure shown comprises an internally driven roller-bearing hub 96 of the usual automotive design. A swinging clamp bolt 97 secures the webs W of the tread members to the conical bearing face 98 of the wheel center C as shown in Fig. 19, while in Fig. 20, a clamping ring 99 having handles 100 engages the edge of angle plates 101 carried by the tread member webs W. This clamping ring 99 is threaded around the hub 96ᵃ of the wheel center, and carries a latch 102 which engages a rack 103 mounted on the angle 101.

Fig. 19ᵃ shows a modification of the form illustrated in Fig. 19, and is somewhat similar to the form shown in Fig. 17ᵃ, in which the two treads are separated laterally so that the gauge or track width of the highway tread H is substantially greater than that of the railway tread R. Both of these treads have interchangeable clamping flanges W to contact with the same conical fitting face 104 of the wheel center C, which face is here shown convex. The clamping flanges W are held against the fitting face 104 of the wheel center by a clamping cone 105 threaded around the wheel hub.

In Fig. 20ᵃ, the two treads H and R are separated laterally, and at the same time, the diameters of the two tread members differ considerably. In the designs formerly illustrated the diameters of R and H are substantially the same. The relatively wider track for the highway wheel operates to effectively stabilize the load during the rougher journey over the highway, while the wheel diameter of H, being considerably less than that of R as shown in Fig. 20ᵃ, acts in transmitting greater driving power in this service. Clamping cones of different depth hold the webs W of tread members H and R against separate vertical bearing faces of wheel center C.

In Figs. 21 and 22 is shown the usual automotive construction for roller bearing wheel centers mounted on swinging wheel-pins or fixed axles F. In Fig. 21 the disk 106 of the wheel center C has a convex conical outer bearing face for contact with the webs W of the tread members, which members are clamped thereto by right and left threaded double throw clamping device and locking arrangement similar to that illustrated in Fig. 5.

The form shown in Fig. 22 is similar to that shown in Fig. 21, the difference being that in this form the web 106ª is vertical and carries about its perimeter a cylindrical seat 107 for the tread members. The clamping ring 108, which is shown equipped with operating handles 108ª, has a continuous angular contact adjacent to the inner edge of the web W as shown at 109. While this contact is shown continuous, obviously it may be intermittent if found desirable.

In the form shown in Figs. 23 and 24, the structure is similar to that shown in Figs. 13 and 14, except that in this case the usual automotive construction is included, comprising a revolving hub 110 for the wheel center C. This hub is mounted on roller bearings and driven by a shaft enclosed within a tubular housing carrying the bearings. In Fig. 23, the webs W of the tread members R and H are made S-shaped in cross-section and have stiffening ribs 111 formed by radial displacements made in these webs. The webs are also provided with a plurality of apertures 112 with which are interlockingly engaged projections 113 carried by the wheel center and which hold said center and web against relative movement.

In Fig. 24, the usual construction for wooden wheels is shown, the hubs of the tread members 110ª being equipped with metal bushings 114 to provide durable contact faces adapted to slip over the outer face of the hub 110 of the wheel center C, and to be held in position by a clamping cone 115. The inner edges of the hubs 110ª are offset or slotted to engage projections 110ᵇ from wheel center C, in order to prevent relative rotation.

In Fig. 24ª, the highway tread H has the inside position relative to the railway tread R, whereby a narrower gauge is provided for the former than for the latter. This arrangement is particularly adapted to vehicles of the smaller type, or to such trucks or conveyances as can effectively use a narrower distance between its highway wheel tread than the standard 56½″ track gauge. It is of course to be understood that, when the service requires, the tread diameters of H and R may be substantially different.

In Figs. 25 and 26, a type of wheel is shown in which the tread members H and R have little or no disk portion or clamping webs W, offsets or short ribs 116 being substituted for the webs shown in the other figures. The tread members therefore, in these designs, are in the form of simple tires, or shallow rings 117 with suitable tire or surface engaging member 118 mounted thereon preferably by shrinking.

In Fig. 25, the underfaces of the tread members H and R have inclined clamping surfaces 119 which bear against and are clamped to the conical bearing face 120 of the wheel center C, while in the forms shown in Fig. 26 these bearing faces are made cylindrical as illustrated at 119ª and are slipped over the metal faced wooden rim 121 of the wheel center C. In both of these figures the tread members are held in place by clamping disks or cones 122 having rim edge contact with the offset or short ribs on the outer face of the tread members. These clamping cones 122 are equipped with a cylindrical hub 123 which encircles a retaining ring 124 designed to hold the wheel center C to keyed position on the revolving axle A. This retaining ring 124 has threaded engagement with a projection 125 on the end of the axle. This projection also carries a clamping ring 126 which engages the edges of the hub of the clamping cone. A combined hub cap and jam nut 127 is threaded around the axle extension 125 and serves to lock the clamping ring in position.

In the form shown in Fig. 25, the wheel center C includes a cast or forged hub 128, to which is secured preferably by riveting or welding a thin plate disk 129 having radial ribs 130 formed by displaced portions around the wheel, said ribs acting to stiffen the web and rim of the wheel center C. The outer face of the rim 120 of the wheel center has a rib 131 designed to fit in a groove 132 formed in the under side of the tread member, so that these parts may be locked against relative rotation.

A form similar to that illustrated in Fig. 25 is shown in Fig. 25ª, in which the inner under face of a standard railway tire R and highway tire H abut a narrow conical face 133 of the wheel center C, while the under face adjacent to its outer edge contacts with a narrow cylindrical face 134 of the rim C. This rim is formed from a sheet metal plate and is carried by the ends of the spokes S. A clamping disk or cone 135 holds these tires in operative position, and has its periphery slotted as shown at 136 to engage pins 137 projecting from the outer face of the member W.

A modification of the form shown in Fig. 26 is illustrated in Fig. 26ª, in which a metal wheel center C is shown. In this form, the tread members H and R and the clamping plates 138 are made integral.

A slightly different form of the invention is illustrated in Fig. 27, in which a wheel center C is shown having a flange 139 extending outwardly from one edge of its rim and designed to engage the inner edge of the tread members H and R. The outer edge of these tread members are engaged by a clamping cone 140 which holds the members tightly against the flange 139. The tread members may comprise a cushion member 140ª interposed between the working tread and wheel center C.

In Fig. 28, a ribbed cast wheel center C is shown of the usual type for heavy auto trucks. A wide flange or rib 141 provides a vertical clamping face for the webs W of the tread members. One or more pins 142 project laterally from this flange 141 and interlock with corresponding holes formed in the web members W. These pins also extend through openings 143 formed in the edges of a clamping cone 144. This cone is designed to hold either one or two webs of the tread members tightly against the clamping face of the flange 141. The hub 145 of the cone is internally threaded to form part of a double throw rotary clamping mechanism similar to that shown in Fig. 5. This form of the invention comprises two separate tread members H for highway service and a third separate tread member R for railway service. One or both of the highway tread members may be used according to the load carried and the unit pressure desired on the highway. This wide wheel tread is particularly desirable for wheels of small diameter designed for heavy loads.

In the several figures, various kinds of treads are shown, and obviously any desired form may be used. It is to be understood that the highway and railway treads are interchangeable, the highway treads in the drawings being shown in full lines while the rim portion of the railway treads which may be substituted therefor are shown in dotted lines. It will be understood also, that all clamping flanges W shown in full lines are intended to represent the clamping flange for the railway tread R as well as for the highway tread H.

It will thus be seen that in all the forms shown, the wheel structure includes a wheel center and interchangeable tread members adapted for either railway service or highway service as is desired, and the means employed for effecting this conversion is such as to permit the change to be accomplished with great speed and ease.

Without further description, it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. A convertible wheel structure for vehicles comprising a wheel center, tread members, and centrally located means for interchangeably attaching said members to said center thereby to adapt the wheel structure for service on railway tracks or on a highway.

2. A wheel structure convertible to railway and to highway service comprising a wheel center, interchangeable tread members, and a rotating clamping and release member co-axial with the wheel for attaching said members to said center.

3. A convertible wheel structure for vehicles comprising a wheel center, interchangeable railway and highway tread members to coact with said center, and a centrally located member to hold said parts together.

4. A convertible wheel structure for vehicles comprising a wheel center, interchangeable railway and highway tread members to coact with said center, and an annular member greater in diameter than the wheel hub and extending to the wheel hub to hold and to release said parts.

5. A convertible wheel structure for vehicles comprising a wheel center, interchangeable railway and highway tread members to coact with said center, and clamping means for securing said members to said center, said means having a centrally located member.

6. A convertible wheel structure comprising a wheel center, separate quickly interchangeable railway and highway tread members coacting with said center, and a member extending to the wheel hub and having a rotating clamping action concentric with the wheel, for holding said tread members in tightened operating position.

7. A convertible wheel structure for vehicles comprising a wheel center, interchangeable railway and highway tread members to coact with said center, a centrally located clamping member and means for limiting the rotation of said tread members relative to said center.

8. A convertible wheel structure for vehicles comprising a wheel center, interchangeable railway and highway tread members to coact with said center, a centrally located clamping member, and means for limiting the rotation of said clamping member relative to said tread members.

9. A convertible wheel structure for vehicles comprising a wheel center, interchangeable railway and highway tread members to coact with said center, a centrally located clamping member, and means for limiting the rotation of said clamping member relative to said wheel center.

10. A wheel structure convertible to railway and to highway service comprising a wheel center, having a radially disposed web or spoke portion, and interchangeable appliances abutting said web and means for detachable connection with said center to adapt it for use on a railway track or on a highway.

11. A convertible wheel structure for vehicles comprising a wheel center, interchangeable appliances for said center, one of which is adapted for railway tracks and the other for highways, and clamping means for connecting said appliances with said center, said clamping means having a portion extending adjacent to the wheel hub.

12. A convertible wheel structure for vehicles comprising a wheel center, interchangeable appliances for said center, one of which is adapted for railway tracks and the other for highways, and centrally located rotating clamping means for connecting said appliances with said center.

13. A wheel structure convertible to railway and to highway service, comprising a wheel center having a radially disposed web or spoke portion, separate tread members interchangeable with each other and fitting said web, one of said members being adapted to run on a railway track and the other on a highway.

14. A wheel structure convertible to railway and to highway service comprising a wheel center, a separate member comprising a standard car wheel tread and flange for detachable mounting on said center to adapt the wheel structure to run on a railway track, and another tread member interchangeable with said car wheel tread to adapt the wheel structure to run on the highway, said interchangeable treads having radially disposed portions to afford a bearing on said wheel center.

15. A wheel center for vehicles, a coacting tread member separate from said center and adapted to run on railway track, and another member interchangeable with said track member and adapted to run on the highway, said tread members contacting with the wheel center within a cylindrical surface coaxial with the wheel center and intersecting the inner most portion of its perimeter.

16. A convertible wheel structure for vehicles comprising a wheel center and interchangeable tread members, and centrally located clamping means one of said members being adapted to run on railway tracks, and the other on a highway.

17. A convertible wheel for vehicles adaptable to run on railway track and on the highway, the tread portions of said wheel being separate from the wheel center and held in a tight operating position by clamping means extending adjacent to the wheel hub.

18. A wheel center for vehicles, and separate quickly changeable railway and highway tread members adapted to coact with said center, within a cylindrical surface coaxial with the wheel center and intersecting the inner most portion of its perimeter.

19. A wheel center for vehicles, a member separate from said center and having a standard car wheel flange, and another member interchangeable with said flanged member and adapted to run on the highways, a portion of said member connecting with said wheel center within a cylindrical surface coaxial with the wheel center and intersecting the innermost portion of its perimeter.

20. A vehicle wheel having a hub and a radially disposed web or spoke portion, a detachable integral annular tread member adapted to contact with said hub or web portion, and centrally located clamping means.

21. A vehicle wheel having a hub and a radially disposed web or spoke portion, a releasable tread member laterally opposed to said web and contacting with its outer face, at least a part of the perimetrical width of said web or spoke portion to stand free from the underside of said tread member around its entire circumference.

22. A vehicle wheel having a hub and a radially disposed web or spoke portion, a quickly releasable integral annular tread member laterally opposed to and contacting with said web, and centrally located clamping means.

23. A vehicle wheel having a hub, a radially disposed web or spoke portion, two detachable tread members, and clamping means comprising a right hand and a left hand screw lying on the same side of said web or spoke portion.

24. A vehicle wheel having a hub and a radially disposed web or spoke portion, and two interchangeable tread members to adapt said wheel for use on a railway track and on the highway, said tread members contacting with the wheel within a cylindrical surface intersecting said web or spoke portion at their most distant extremity on said hub, and releasable clamping means to hold said tread members in tight operating position.

In testimony whereof I hereunto affix my signature.

SAMUEL G. THOMSON.